Patented Apr. 10, 1934

1,954,433

UNITED STATES PATENT OFFICE 1,954,433

METHOD OF PREPARING ACID AMIDES

Charles A. Thomas, Dayton, Ohio, and John F. Olin, Newtown Square, Pa., assignors to The Sharples Solvents Corporation, Philadelphia, Pa., a corporation of Delaware No Drawing. Application August 20, 1932, Serial No. 629,748

4 Claims. (Cl. 260—124)

The present invention relates to a method of forming alkyl substituted amides of fatty acids and its object has been to devise a method for accomplishing this result in which increased yields are obtained without the necessity of employing a catalyst. It includes also, as an important feature, certain of these amides as novel compositions of matter. Methods of producing these amides by the reaction of the fatty acids with alkyl amines have heretofore been known, but these methods have been subject to the objection that they have required the use of catalysts. In the reaction of an amine with a fatty acid, the first product which is formed is the quaternary ammonium derivative formed by the addition reaction between these two compounds. Thus, when acetic acid is reacted with mono-amyl amine the following reaction takes place.

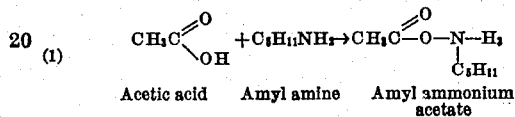

Acetic acid    Amyl amine    Amyl ammonium acetate

The production of the corresponding amide from this compound involves the elimination of water by the combination of two of the hydrogen atoms attached directly to the nitrogen atom with one of the oxygen atoms of the carboxyl group. Thus, amyl ammonium acetate formed in accordance with Equation (1) above may be decomposed into water and acetamyl amide under proper conditions in accordance with the following equation:

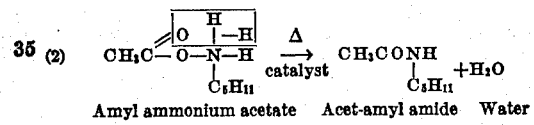

Amyl ammonium acetate    Acet-amyl amide    Water

In this connection the use of strong acid catalysts such as sulphuric acid, beta-naphthalene-sulphonic acid, phosphoric acid, etc., has been suggested. Such catalysts are subject to the common objection that they present a problem of separation from the finished product and that they also tend to effect a decomposition of the intermediate ammonium compound, forming the alkyl amine and fatty acid from which that compound has been derived.

In accordance with our invention, we have been able to produce the desired alkyl substituted amide without the necessity of the use of any such catalysts. This has been accomplished by the effective removal of the water formed in the reaction indicated at (2) above substantially as fast as such water is formed. In this manner, we are enabled to speed up this reaction by eliminating the reversal of the reaction which involves the combination of the water formed with the amide. By thus effectively avoiding this reversal we increase the efficiency of the process to such an extent that we are able to forego the use of all catalysts whatever and thus incidentally avoid the deleterious consequences of such use set forth above.

In the practice of our invention we first mix the desired acid with a slight excess of the alkyl amine which we desire to react therewith to produce the desired acid amide and place these constituents together with a large quantity of a substance immiscible with water and having a relatively high boiling point. The function of this immiscible substance is to carry off the water in the form of a constant boiling mixture as fast as such water is formed during the course of the reaction. A small quantity of amine is likewise carried off during the course of the distillation and the purpose of adding an excess of amine is to maintain a sufficient quantity thereof in the reaction vessel to complete the reaction in spite of the fact that a certain small amount of amine passes off with the distillate. After the mixture is placed in the reaction vessel, it is gradually heated in order to slowly distill off the water and immiscible substance in the form of a constant boiling mixture substantially as fast as the water is formed. When the reaction is completed, the residue in the reaction vessel is carefully vacuum-distilled to separate the amide from the other constituents remaining therein. Examples of immiscible substances which can be used in the practice of this process to perform the function of carrying off the water formed in the reactions are xylene, benzene, amyl benzene and solvent naphtha.

The following specific examples illustrate the application of the process:

Example 1.—60 grams of acetic acid and 100 grams of amyl amine were placed in a flask together with 300 cc. of xylene. The mixture was slowly distilled until the temperature rose to 150°. In the distillate was the excess amine, water and most of the xylene. The residue was vacuum-distilled and yielded 70 grams of acet-amyl amide boiling at 130 to 135° C. at 500 mm. of pressure.

Example 2.—282 grams of oleic acid, 90 grams of normal amyl amine and 200 grams of amyl benzene were slowly distilled until the temperature reached 190° C. The excess amyl amine, water and amyl benzene passed off in the distillate. The residue was vacuum-distilled and yielded 200 grams of oleic amyl amide which is a thick yellow oil having a boiling point of 240 to 250° C. at 5 mm. of pressure. This oleic mono-amyl amide and the corresponding diamide are believed to be novel compositions of matter and are useful as emulsifying agents and plasticizers.

We wish it to be understood that our method is not in any way restricted to the preparation of the particular compounds recited above for the purpose of illustration. It may, for example, be used in the preparation of the acid di-alkyl amides by the condensation of the di-alkyl amines with the fatty or other acids and the elimination of water from the ammonium compounds so formed to produce the desired alkyl substituted acid amides. We, therefore, wish it to be understood that our invention is not to be limited to the preparation of the particular compounds referred to above, or to the exact details of preparation recited, but that it is to be interpreted in the light of the generic spirit of our invention as defined in the subjoined claims.

We claim:—

1. As a composition of matter, oleic amyl amide.
2. As a composition of matter, oleic di-amyl amide.
3. As a composition of matter, an amyl substituted amide of oleic acid.
4. The method of forming an alkyl substituted amide of a fatty acid which comprises contacting the alkyl amine containing the alkyl radical of the desired alkyl substituted amide with the fatty acid containing the acyl radical of the desired acid amide to cause the reaction of the alkyl amine with the acid and heating the resulting compound in the presence of a liquid immiscible with water and forming a constant boiling mixture therewith to effect conversion thereof into the desired alkyl substituted amide of the fatty acid while removing the water formed by the conversion from the zone of conversion in the form of a constant boiling mixture with the said immiscible liquid.

CHARLES A. THOMAS.
JOHN F. OLIN.